Jan. 15, 1929.
H. E. SMITH
1,699,378
TIRE INFLATING APPARATUS
Filed April 7, 1925      2 Sheets-Sheet 1
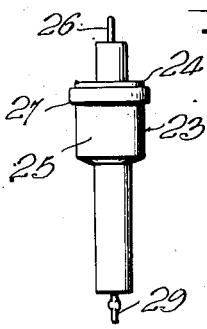
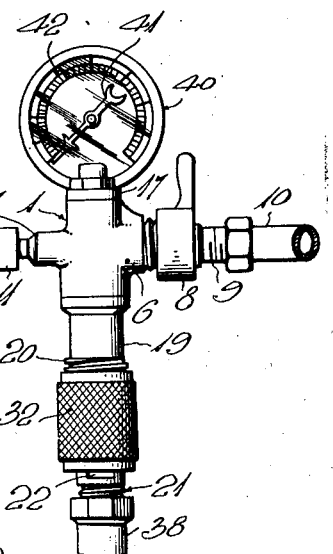
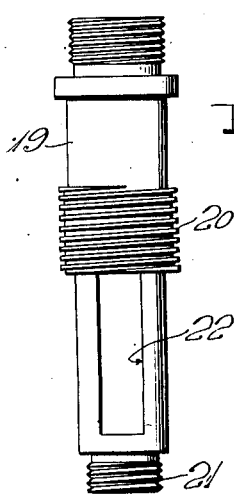
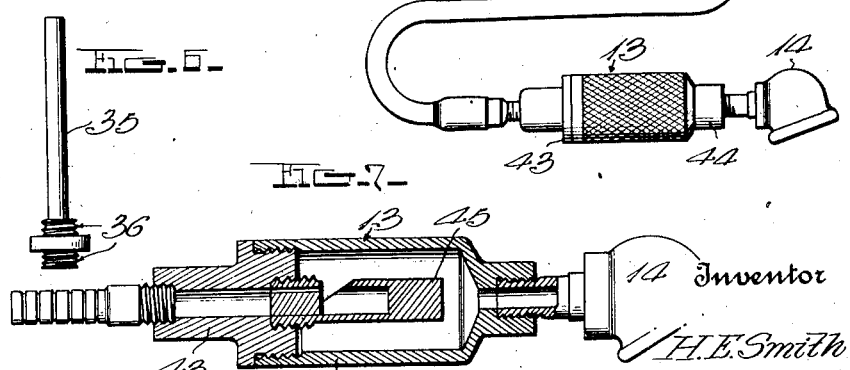
Inventor
H. E. Smith

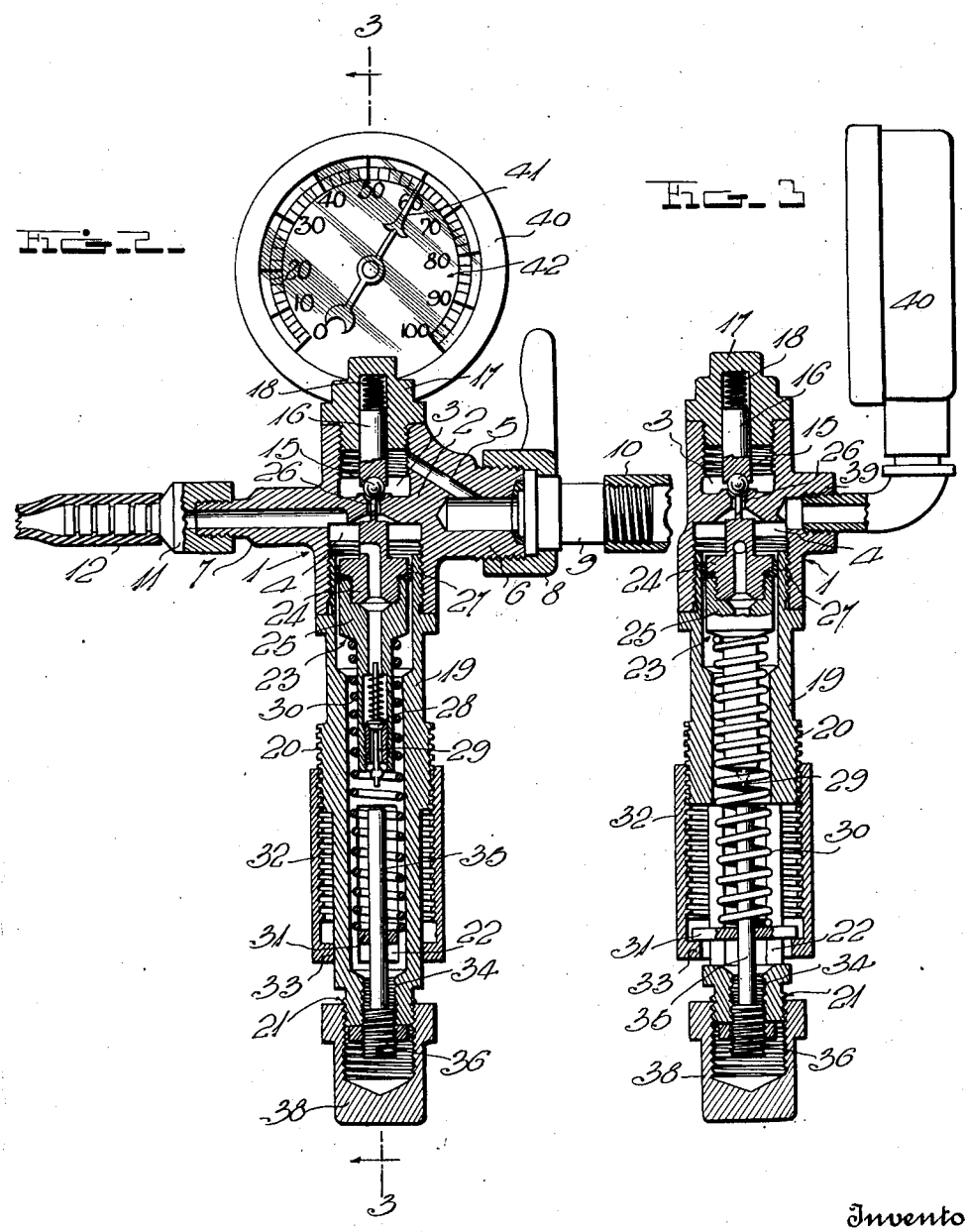

Patented Jan. 15, 1929.

1,699,378

UNITED STATES PATENT OFFICE.

HARVEY E. SMITH, OF TACOMA, WASHINGTON, ASSIGNOR OF ONE-HALF TO WALTER E. RICHTER, OF TACOMA, WASHINGTON.

TIRE-INFLATING APPARATUS.

Application filed April 7, 1925. Serial No. 21,434.

This invention relates to tire inflating apparatus, that is, devices which are used for inflating pneumatic tires with compressed air.

The invention has been designed in order to provide an apparatus of this character with which a pneumatic tire may be inflated with compressed air under predetermined pressure, and the operation of the apparatus is such that when that pressure has been reached no more air will flow into the inflated tire.

According to the invention the apparatus includes a pressure regulating valve which is interposed in the compressed air line in advance of the air hose, and this valve is constructed in such a manner that the pressure of the air delivered to the air hose will be automatically kept at a predetermined pressure regardless of the pressure of the air leading into the valve casing from the supply, and the instant the air in the air hose and therefore in the tire reaches the desired pressure, the regulating valve of the apparatus cuts off the supply of air.

In case the tire should already contain air under excessive pressure, the device will relieve the tire of such excessive pressure, because it is provided with a relief valve. According to the invention this relief valve is normally closed but is opened by movement of the mechanism of the pressure regulating valve under excess pressure.

The invention will be more fully explained hereinafter, reference being made to the accompanying drawings which form a part of this specification.

In the accompanying drawings:

Fig. 1 is a front elevation of an apparatus constructed in accordance with the invention;

Fig. 2 is a vertical sectional view through the casing carrying the pressure regulating valve and the relief valve hereinbefore referred to;

Fig. 3 is another sectional view of the casing, such view being taken substantially on the plane indicated by the lines 3—3 of Fig. 2;

Fig. 4 is an elevation of the piston which forms a part of the regulating valve and which carries the relief valve;

Fig. 5 is an elevation of one of the sections of the valve casing;

Fig. 6 is a similar view of the depressor for the relief valve; and

Fig. 7 is a longitudinal sectional view of the hereinbefore mentioned whistle.

In the illustrated embodiment of the invention the numeral 1 represents the main section of the valve casing. This section is provided internally with an apertured partition 2 dividing it into an inlet chamber 3 and an outlet chamber 4, the chamber 3 communicating through a passage 5 with an inlet nipple 6, and the chamber 4 being open to communication with an outlet nipple 7. The inlet nipple 6 is coupled by a quick-separable coupling member 8 to a pipe section 9, which in turn is coupled to a pipe 10 forming part of the air line, it being understood that this pipe 10 extends from a compressed air tank or other suitable source of compressed air. Coupled to the outlet nipple 7 of the casing section 1 by means of a coupling member 11 is a flexible air hose 12.

The outer or free end of the air hose 12 carries a hollow casing 13 in which the above described whistle is mounted, and to this casing is attached the valved air chuck 14 of the ordinary construction. The preferred arrangement of the air chuck 14 with respect to the casing 13, as well as the construction of the casing itself and the arrangement of the whistle therein, will be hereinafter described in detail.

The side of the partition 2 of the casing section 1 facing the inlet chamber 3 is provided with a valve seat, and co-operating with this seat is a ball valve 15. This valve is normally held closed by means of a plunger 16 sliding in the recess of a cap 17 threaded to the upper end of the casing section 1. A coil spring 18 confined between the upper end of the plunger 16 and the bottom of the recess in the cap 17 normally holds the ball valve 15 seated.

The casing section 1 below the partition 2 is continued downwardly, is open and is internally threaded to adapt it to receive the upper end of a member 19 which may be considered as another section of the valve casing. This member or casing section 19 is of course externally threaded at its upper end to adapt it to be screwed into the lower end of the section 1, its intermediate portion is externally threaded as at 20 and its lower end is of reduced diameter and is also externally threaded as indicated by the numeral 21. The externally threaded portion 20 of the section 19 is of greater diameter than the remaining portions of the section, and formed in the opposite walls of the portion of the section 19 just below the threaded portion 20 are vertically elongated openings or slots 22. These openings or slots 22 of course communicate with the interior of the section 19 which is hollow.

Slidably mounted within the upper end of the hollow section 19 is a piston 23, which as shown may be composed of an upper section 24 and a lower section 25, the upper section 24 preferably being threaded into the lower section 25 and carrying a depressor 26 adapted to extend through the aperture in the partition 2 and engage and open the ball valve 15. Between the two sections 24 and 25 of the piston 23 a suitable piece of packing 27 is clamped. This packing engages the inside of the bore of the casing section 19 and prevents air from the chamber 4 from passing between the piston and the casing section 19.

The lower end of the piston section 25 is of reduced diameter and is bored to receive an inwardly opening relief valve 28. This valve 28 may be constructed in any suitable manner, but it is preferably formed the same as the air valve in a pneumatic tire and has a stem 29 projecting out of the lower end of the piston section 25 so that it may be depressed by the depressor hereinafter described to open the valve 28.

Surrounding the reduced lower end of the piston section 25 is a coil spring 30. The upper end of this spring bears against the shoulder formed at the junction of the large upper end of the piston section 25 and the reduced lower end of the latter, while the lower end of the spring 30 bears against a cross bar 31 which extends across the casing section 19 and has its ends extending through the openings or slots 22 and projecting beyond the outer walls of the casing section 19. This coil spring 30 exerts upward pressure upon the piston 23 in opposition to the pressure exerted upon the upper end of the piston by the air contained in the chamber 4.

In order to adjust the tension of the spring 30 an internally threaded sleeve 32 is threaded on to the externally threaded intermediate portion 20 of the casing section 19. The lower end of this sleeve 32 is provided with an internal annular shoulder 33, against which bear the end portions of the hereinbefore mentioned cross bar 31. It will therefore be seen that by turning the sleeve 32 the cross bar 31 will be moved up or down in the openings or slots 22, thereby increasing or decreasing the tension of the spring 30.

The lower end of the casing section 19 is also internally threaded as indicated by the numeral 34, and threaded in this portion of the section 19 is a pin or depressor 35 for the relief valve 28. The threaded portion 36 of the pin or depressor 35 is provided at its lower free end with a transverse notch to receive the blade of a screw driver or the like so that it may be adjusted. Threaded upon the externally threaded lower end 21 of the casing section 19 is a cap 38.

The back of the casing section 1 is provided with an attaching nipple 39 to which is fastened in any suitable manner a pressure gauge 40 having a pointer 41 operable over a graduated dial 42. The nipple 39 is in open communication with the chamber 4 of the casing section 1 so that the pressure gauge will register the pressure of the air contained in the chamber 4. Moreover, since the chamber 4 is in open communication with the nipple 7 and the air hose 12 the gauge will register the pressure of the air contained in the air hose and when the chuck 14 is applied to the inflating stem of a pneumatic tire the pressure of the air in the tire, tire hose 12, nipple 7 and chamber 4 will be equalized so that the gauge 40 will register the pressure of the air in the tire.

The hereinbefore described casing 13 for the whistle is preferably composed of two sections, a section 43 which may be termed an inlet section because it is coupled to the free end of the air hose 12, and an outlet section 44 from which the air passes into the chuck 14. The section 44 is threaded on to the section 43 and is preferably hollow. The last mentioned section 43 is bored and carries a whistle 45. This whistle 45 is preferably threaded into the bore of the section 43, but its main portion extends into the hollow portion of the section 44. The whistle is of the usual construction, so that as long as air is passing through the whistle, the casing 13 and the chuck 14 into a pneumatic tire, a sound will be produced. When this sound ceases the operator will know that his tire has been completely inflated, that is inflated to the desired amount.

The use and operation of the device will now be explained:—

When the apparatus is not in use the valve in the air chuck 14 will be closed, so that no air will be passing through the different parts of the apparatus. If a person goes to the apparatus and desires to inflate a pneumatic tire, say with compressed air under a pressure of sixty pounds per square inch, the operator should first turn the sleeve 32 until the pointer 41 registers sixty upon the graduated dial 42. When the sleeve 32 is turned in the proper direction the spring 30 will be put in proper tension to place the piston 25 in such a position that it would be balanced by sixty pounds per square inch air pressure. Thus, as long as the air in the casing section 4 should be under less pressure than sixty pounds per square inch the spring 30 would hold the piston 23 raised and the valve depressor 26 would hold the ball valve 15 open so that air from the chamber 3 would pass through the aperture in the partition 2 into the chamber 4. As soon as pressure of sixty pounds per square inch should be attained in the chamber 4, that pressure would balance or overcome the tension of the spring 30 and move the piston 23 downwardly, thus withdrawing the depressor 26 and permitting the valve 15 to close. The operation of the piston 23 and depressor 26 is therefore automatic and would maintain the pressure in the chamber 4 constant. Of course, if a different pressure than sixty pounds per square inch should be desired, that can be obtained by adjusting the sleeve 32 differently.

In case the pressure contained in the pneumatic tire should be excessive, say above sixty pounds per square inch, that excess pressure would act upon the piston 23 and force it downwardly to such an extent that the stem 29 of the relief valve 28 would be engaged by the stem or depressor 35. When this happens the relief valve 28 would be opened and air would escape into the atmosphere, but as soon as the pressure should be reduced to the proper amount, the spring 30 would raise the piston 23, and the valve 28 would be closed.

By the use of the whistle with the device the operator can tell when his tire has been completely inflated.

From the foregoing description, taken in connection with the accompanying drawings, the construction, use and operation of the invention will be readily understood.

Various changes in form, proportion, and in the combination and arrangement of parts may be made without departing from the spirit and principle of the invention and without sacrificing any of the advantages thereof, so that it is to be understood that such may be done within the meaning and scope of the appended claims.

I claim:

1. In a combined pressure regulating valve and excess pressure relief tire inflating means; a valve casing, a partition dividing said casing to form an inlet and an outlet chamber connected respectively with an air line and with a tire connecting air hose, a spring pressed plunger closed valve in said partition to control communication between said chambers, an exteriorly threaded casing extension below said partition, a sleeve threaded on said extension, a piston slidable in the upper portion of said extension and carrying a valve opening device to open the valve in said partition, said piston having a bore extending therethrough and provided with a relief valve, a coiled spring for engaging said piston and normally forcing it upward, means carried by said sleeve with which said spring is engaged so that rotation of the sleeve will control the tension of the spring, said casing extension being slotted to afford communication with the atmosphere through the bore in said piston, and a pin mounted in said casing for engagement by said relief valve at predetermined intervals to discharge excess pressure in the outlet chamber.

2. In a combined pressure regulating valve and excess pressure relief valve for tire inflation; a valve casing, a partition dividing said casing to form an inlet and an outlet chamber for connection respectively with an air line and an inflation hose, said partition having an air passage therethrough, a spring-closed valve for said air passage normally preventing communication between said chambers, a casing extension below said partition, a sleeve rotatably surrounding said extension, a pressure-moved member in the upper portion of said extension and carrying a valve opening device to open the valve of said partition, said pressure-moved member having a bore extending therethrough and provided with a relief valve, a coiled spring engaging said pressure-moved member and normally forcing the same in a direction to open said spring-closed valve, means engaged by said sleeve and said spring for utilizing rotation of the former to control the strength of the latter, and a pin mounted in said casing extension for engagement by said relief valve upon predetermined movement of said pressure-moved member away from said spring-closed valve, to discharge excess pressure, said casing extension being slotted to receive a portion of the aforesaid means to permit escape of said excess pressure to the atmosphere.

3. A tire inflating valve comprising a casing having a compressed air passage whose outlet end is adapted for connection with a hose, a valve between the ends of said passage closable toward said outlet end thereof and normally closed to retain air pressure in the inlet end of the passage, a chamber in the casing communicating with the outlet end of said passage regardless of the position of said valve, a spring-pressed plunger free of connection with said valve but capable of abutting the same to effect opening thereof, a pressure-moved member on said plunger disposed in said chamber to be acted on by pressure in said outlet end of the passage to normally hold said plunger against movement to valve-opening position, a vent passage extending longitudinally through said plunger and leading from said chamber, said plunger embodying an inwardly opening vent valve normally closing said vent passage; and a relatively fixed opening device for said vent valve, said opening device being disposed to be struck by said vent valve when the plunger is moved excessively away from the first named valve.

In testimony whereof I have hereunto affixed my signature.

HARVEY E. SMITH.